United States Patent [19]

Berkman

[11] 4,003,468

[45] Jan. 18, 1977

[54] CASE AND INSERT FOR DIFFERENTLY SIZED MAGNETIC TAPE ENCLOSURES

[76] Inventor: Joseph L. Berkman, 48 Country Road, Mamaroneck, N.Y. 10543

[22] Filed: Mar. 24, 1975

[21] Appl. No.: 561,315

Related U.S. Application Data

[63] Continuation-in-part of Ser. No. 382,302, July 25, 1973, Pat. No. 3,889,817.

[52] U.S. Cl. .............................................. 206/387
[51] Int. Cl.² ............... B65D 85/30; B65D 85/62; B65D 85/67; B65D 5/50
[58] Field of Search ............ 206/387, 73, 541, 454, 206/455, 449; 229/15; 190/28, 16; 312/200

[56] References Cited

UNITED STATES PATENTS

| | | | |
|---|---|---|---|
| 1,572,454 | 2/1926 | Vastola | 312/11 |
| 1,901,533 | 3/1933 | Preddey | 211/50 |
| 3,171,700 | 3/1965 | Parsell et al. | 206/541 |
| 3,266,704 | 8/1966 | Deeren | 229/15 |
| 3,269,495 | 8/1966 | Bush | 190/57 |
| 3,489,272 | 1/1970 | Rosen | 229/15 |
| 3,495,716 | 2/1970 | Gregory | 211/4 |
| 3,543,943 | 12/1970 | Joy | 211/131 |
| 3,565,282 | 2/1971 | Staar | 211/83 |
| 3,603,478 | 9/1971 | Gonnan | 221/87 |
| 3,620,367 | 11/1971 | Stembel | 206/387 |
| 3,633,761 | 1/1972 | Holliday | 211/131 |
| 3,635,350 | 1/1972 | Wolf | 211/40 |
| 3,674,132 | 7/1972 | Loss | 206/387 |
| 3,692,376 | 9/1972 | McKinsey et al. | 312/11 |
| 3,710,900 | 1/1973 | Fink | 190/51 |
| 3,736,036 | 5/1973 | Mathus | 312/285 |
| 3,743,081 | 7/1973 | Roberg et al. | 206/387 |
| 3,756,383 | 9/1973 | Kryter | 206/73 |
| 3,785,499 | 1/1974 | Gedye | 211/4 |
| 3,830,363 | 8/1974 | Liber | 206/387 |
| 3,889,817 | 6/1975 | Berkman | 211/163 |
| 3,907,116 | 9/1975 | Wolf et al. | 206/387 |
| D167,361 | 7/1952 | Lester | D33/8 |
| D182,697 | 4/1958 | Warren | D44/10 |
| D197,752 | 3/1964 | Holtzman | D87/5 F |
| D197,991 | 4/1964 | Caprioli | D58/13 |
| D220,989 | 6/1971 | Diloia | D87/1 D |
| D230,527 | 2/1974 | Berkman | D87/1 D |
| D230,528 | 2/1974 | Berkman | D87/1 D |
| D230,779 | 3/1974 | Kryster | D87/1 D |
| D233,375 | 10/1974 | Berkman | D87/1 D |
| D237,338 | 10/1974 | Berkman | D6/186 |

FOREIGN PATENTS OR APPLICATIONS

| | | |
|---|---|---|
| 856,608 | 11/1970 | Canada |
| 1,258,372 | 3/1961 | France |
| 1,330,916 | 5/1963 | France |
| 633 | 2/1880 | United Kingdom |

OTHER PUBLICATIONS

Casemakers, Inc.'s Flyer dated Apr. 1, 1972, page, Items Str. 30 and CAS.-30.
Home Furnishings Daily, (Sec. II, p. 62), Jan. 12, 1973.

*Primary Examiner*—William T. Dixson, Jr.
*Attorney, Agent, or Firm*—Lackenbach, Lilling & Siegel

[57] ABSTRACT

A carrying case in the nature of a valise includes parallel rows of magnetic tape enclosure storage compartments. Each compartment is molded to form a somewhat thicker and narrower space to securely receive a standard 8-track cartridge and, within a substantially coextensive space, a somewhat thinner and wider space to securely receive a standard cassette storage box so that both types of commonly used magnetic tape enclosures may be interchangeably received and stored within the compartment without excessive movements and dislocations within the case during transit.

20 Claims, 3 Drawing Figures

4,003,468

CASE AND INSERT FOR DIFFERENTLY SIZED MAGNETIC TAPE ENCLOSURES

CROSS REFERENCE TO RELATED APPLICATION

This is a continuation-in-part application of U.S. Pat. application, Ser. No. 382,302 filed July 25, 1973 now U.S. Pat. No. 3,889,817, granted June 17, 1975.

This application is also related to my co-pending earlier U.S. Design Patent applications Ser. No. 442,776, filed Feb. 15, 1974, and entitled "Tape Cartridge and Cassette Valise", and Ser. No. 442,777, also filed on Feb. 15, 1974 and entitled "Tape Cartridge and Cassette Cabinet".

BACKGROUND OF THE INVENTION

This invention generally relates to magnetic tape storage devices, and more specifically to a carrying case for interchangeably receiving and storing two differently sized magnetic tape enclosures.

Numerous storage devices are known which are intended to receive magnetic tape enclosures, such as standard 8-track cartridges or cassettes. All of the known devices are suitable for receiving only one of the aforementioned types of magnetic tape enclosures. Accordingly, it has been necessary in the past to acquire two storage devices, one for 8-tracks, and one for cassettes. This has resulted in unnecessary inconvenience and expense.

In my earlier filed application Ser. No. 382,302, for a RACK, there is disclosed a number of stackable rack elements and a rack assembled therefrom for interchangeably receiving and storing both magnetic tape cartridges and cassettes. The device described in my prior application is in the nature of a carousel which may be turned to bring successive tapes into view for facilitating selection. However, the prior disclosed RACK is intended to be supported on a surface such as a table and is not intended to be carried about.

SUMMARY OF THE INVENTION

Accordingly, it is the object of the present invention to provide a carrying case for magnetic tapes which does not have the above suggested disadvantages of comparable prior art devices.

It is another object of the present invention to provide carrying cases of the type under discussion which is simple in construction and economical to manufacture.

It is still another object of the present invention to provide a carrying case as in the above objects, which is suitable for interchangeably receiving both standard 8-track cartridges as well as cassette storage boxes.

It is yet another object of the present invention to provide cases as in the last object, which includes a number of storage compartments or bins each of which can securely hold a standard 8-track cartridge or a cassette storage box and prevent the latter magnetic tape enclosures from excessive undesired movements within the case during transit.

Accordingly, in order to achieve the above objects, as well as others which will become apparent hereafter, cases in accordance with the present invention is described below which is suitable for interchangeably receiving and storing two differently sized magnetic tape enclosures having generally rectangular configurations. The first enclosure has a small width and a greater thickness than the corresponding dimensions of the second enclosure. The case in accordance with the present invention comprises a plurality of tandem storage compartments arranged in rows, each of which is adapted to interchangeably receive a first and a second dimensioned magnetic tape enclosure. Each compartment is generally rectangular in configuration and bounded on two sides by two substantially parallel wall portions spaced from each other a first predetermined distance approximately equal to the width of the first enclosure to securely receive the same therebetween. A further wall portion is provided which is substantially normal to said parallel wall portions. Each compartment is open on one side thereof opposite said further wall portion for receiving the enclosures. Guide means are provided which at least partially bound said wall portions of each compartment to define a space having a thickness equal to a second predetermined distance approximately equal to the tickness of the first enclosure for guiding the first enclosures into said compartments and preventing the first enclosures from moving transversely therein. In the presently preferred embodiment, elongated rectangular recesses are provided in said spaced parallel wall portions of each compartment which open at the compartment open end and extend toward said further wall portions. Each recess forms retaining wall portions which define a space having a width greater than said first predetermined distance and a thickness smaller than said second predetermined distance suitable for securely receiving a second enclosure to thereby prevent transverse movements of a second enclosure within said compartments. In this manner, each compartment can interchangeably receive either a first or a second enclosure and maintain each securely therein by insertion through an associated compartment open end and respective cooperation with either said guide means or said retaining wall portions of said recesses.

The present invention will be better understood and the objects and important features, other than those specifically enumerated above, will become apparent when consideration is given to the following details and description, which when taken in conjunction with the annexed drawing, describes, discloses, illustrates and shows a preferred embodiment or modification of the present invention and what is presently considered and believed to be the best mode of practice in the principles thereof. Other embodiments or modifications may be suggested to those having the benefit of the teachings herein and such other embodiments or modifications are intended to be reserved especially as they fall within the scope and spirit of the subjoined claims.

DESCRIPTION OF THE PREFERRED EMBODIMENT

Figure 1:
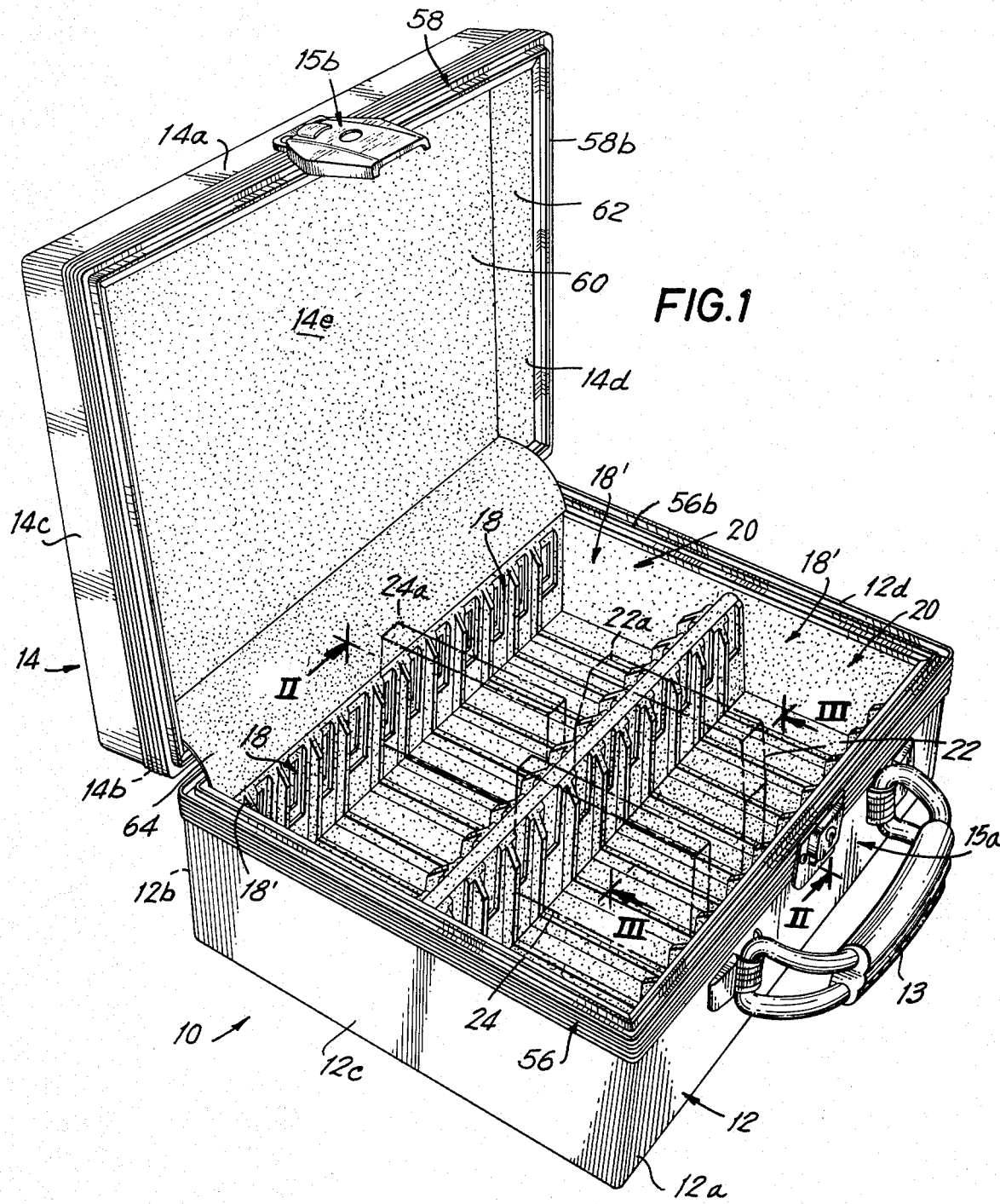
FIG. 1 is a perspective view of a case and inspect for magnetic tape enclosures in accordance with the present invention, showing in phantom outlined how both standard 8-track cartridges as well as cassette storage boxes can be received and securely maintained within the carrying case.

Referring now specifically to the drawings, in which identical or similar parts are designated by the same reference numerals throughout, and first referrring to FIG. 1, the storage case, which in this embodiment is in the form of a portable carrying case or valise in accordance with the present invention is generally designated by the reference numeral 10.

The carrying case 10 has a lower tape receiving portion or receptacle 12 which is generally rectangular in shape and is formed by a front wall 12a, a rear wall 12b, end walls 12c and 12d and a bottom wall 12e. The bottom and rear walls are showin in FIG. 2.

Figure 2:
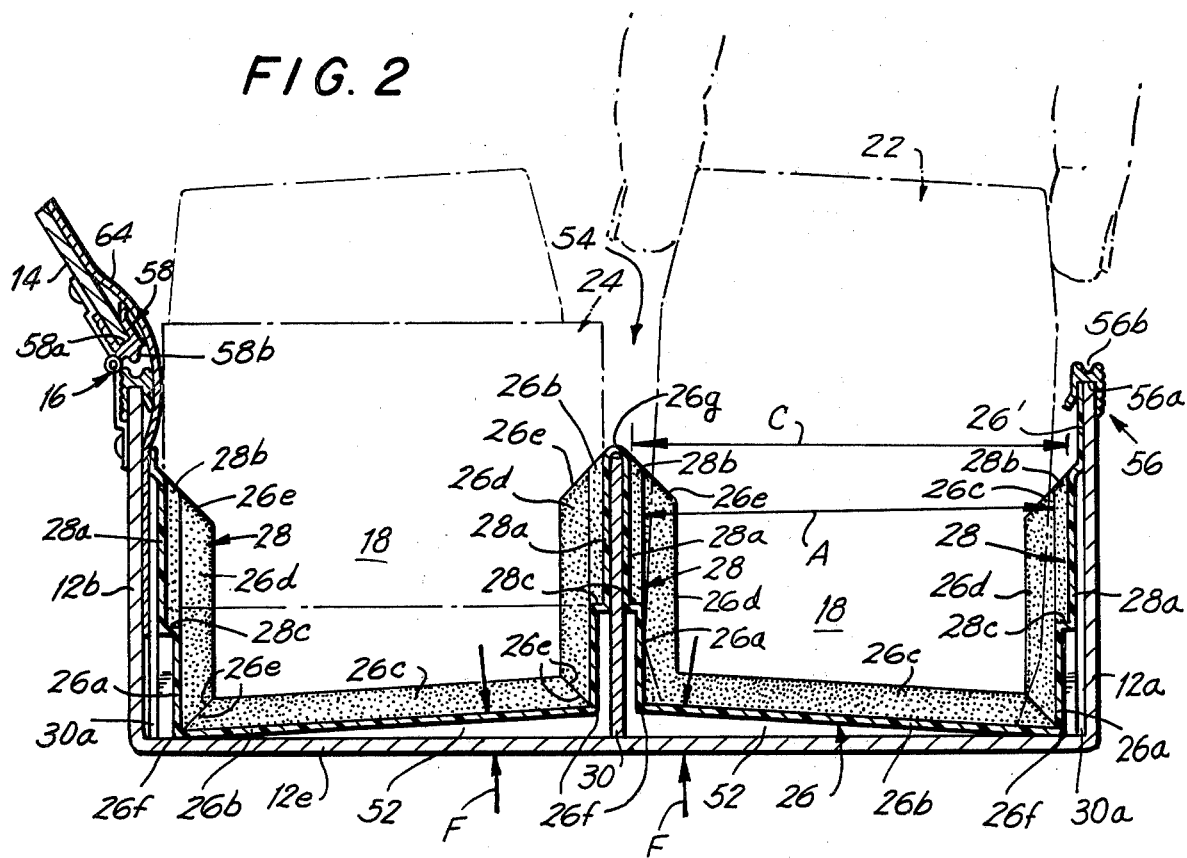
FIG. 2 is a cross-section of the carrying case shown in FIG. 1, taken along line II—II showing in phantom outline how the compartments or bins received both cassette storage boxes and standard 8-track cartridges and maintain the same securely therein, and further showing a variation of a presently preferred embodiment wherein the bottom walls of two adjacent rows of compartments are inclined relative to each other so as to separate the upper ends of the cartridges or cassette boxes to facilitate gripping thereof.

The carrying case is also provided with a cover 14 which is hingedly connected to the receptacle 12 by means of hinges 16 as shown in FIG. 2. The cover 14 includes walls 14a–14d which respectively correspond to the receptacle walls 12a–12d. The cover 14 also includes a top wall 14e which dimensionally corresponds to the bottom ball 12e of the receptacle 12.

The cover 14 is movable about the hinges 16 between a closed position and an open position as shown in FIG. 1 wherein the receptacle 12 is open to provide access to the interior thereof for inserting or removing magnetic tape enclosures as to be described.

A handle 13 is provided on the front wall 12a of the receptacle 12 to facilitate transportation thereof and a lock including elements 15a and 15b are provided on the front walls 12a and 14a respectively for locking the carrying case during transit and thereby prevent inadvertent opening of the case and loss of its contents.

While the present invention is not to be limited to specific types of magnetic tape enclosures, the presently preferred embodiment is particularly suited for interchangeably receiving and storing first and second enclosures each having generally rectangular configurations. The first enclosure, for the purposes of the description that follows, is a standard 8-track cartridge which has a smaller width and a greater thickness than the corresponding dimensions of a second enclosure which in this case is a Norelco-type cassette storage box.

As will be noted from FIG. 1, a plurality of compartments 18 are provided each of which is similarly configurated. The end compartments of each row are designated by the reference numeral 18' and differ from the compartments 18 in that they are bounded by one of the walls 12c, 12d of the receptacle 12.

The 8-track cartridges are designated by the reference numeral 22 and the cassette boxes are designated by the reference numeral 24. Each of these magnetic tape enclosures is generally provided with markings 22a and 24a respectively which designate the title or other wise identify the magnetic recording. The portable carrying case 10 of the present invention permits both cartridges 22 and cassettes 24 to be interchangeably inserted and stored within the compartments 18, 18' in a manner which both securely retains these magnetic enclosures within the carrying case during transit as well as exposes the markings or designations 22a, 24a for easy identification when the cover 14 is opened.

The configurations of the compartments 18, 18' which permits simple and free interchangeability of the two above mentioned magnetic enclosures will now be described. Referring to FIG. 2, the compartments are shown to be formed from a single continuous sheet of material 26. Advantageously, the sheet of material 26 is made from a synthetic plastic material and is molded to assume the configurations described below and as an insert for the case. Each compartment 18, 18' is generally rectangular in shape as suggested above and is bounded on two sides by two substantially parallel wall portions 26a which are spaced from each other a distance A which is approximately equal to the width of the 8-track cartridge 22, and a further or bottom wall portion 26b which is substantially normal to the parallel wall portions 26a. Each compartment 18, 18' is open on the side thereof opposite to the wall portion 26b for receiving the enclosures 22, 24.

Guidg means at least partially bound the wall portions 26a, 26b of each compartment. In the presently preferred embodiment, the guide means include a bottom rib 26c and side ribs 26d which divide the rows into the comparments or separate the compartments as best shown in FIG. 1. The ribs 26c, 26d are similarly molded from the sheet of plastic material 26.

Figure 3:
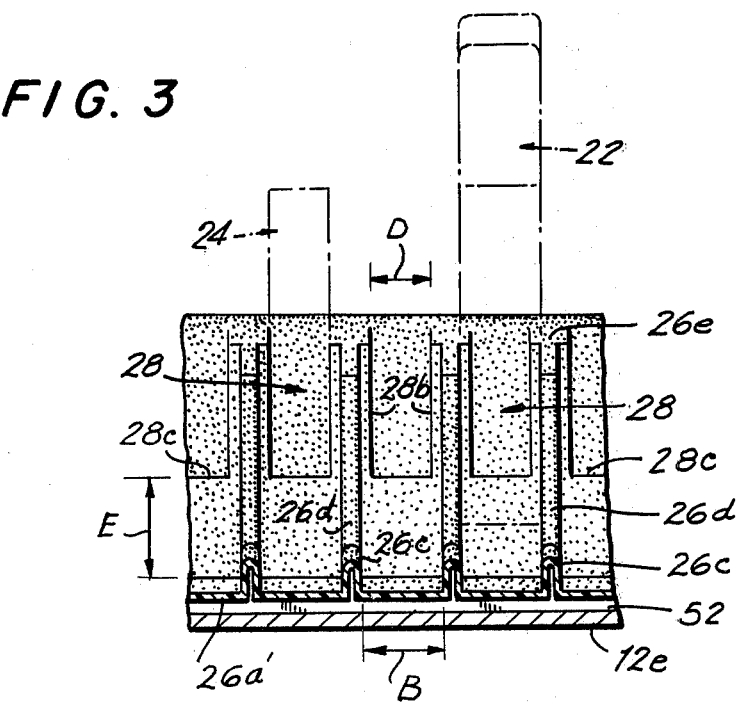
FIG. 3 is a fragmentary cross-section of the storge device shown in FIG. 1, taken along line III—III, showing in phantom outline the relative positions of both a cassette box and of an 8-track cartridge and the manner in which these magnetic tape enclosures are securely maintained within each compartment of the storage device.

The ribs 26c, 26d define a space therebetween having a thickness B which is approximately equal to the thickness of the cartridge 22. The ribs 26c, 26d thereby guide the 8-track cartridge 22 into the compartments 18 and prevent the cartridges 22 from moving transversely therein with excessive play. The dimensions A and B are not critical and may vary within manufacturing tolerances of the standard dimensions for magnetic cartridges. As best shown in FIGS. 2 and 3, fully inserting a cartridge 22 into a compartment 18 brings the lower end of the cartridge into abutment against the side or parallel wall portions 26a, with the end surface of the cartridge resting on or abutting against the bottom wall portion 26b. The parallel wall portions 26a thereby prevent excessive lateral movements or play of the cartridge 22. On the other hand, as best shown in FIG. 3, the bottom ribs 26c and the side ribs 26d engage the major surfaces of the cartridge 22 and prevent the same from excessive transverse movements within the compartment.

In the presently preferred embodiment, the height of the walls 12a–12d extending upwardly from the bottom wall portion 26b is less than the height of the cartridge 22 so that the cartridge extends above or beyond the walls 12a–12d to facilitate the gripping of the cartridge for purposes of removal.

According to an important feature of the present invention, there is provided a pair of elongate rectangular recesses 28 one in each of the parallel side wall portions 26a. While two opposing recesses have been shown to be provided in each of the parallel side wall portions 26a, it will become apparent hereafter that even a single recess 28 may be sufficient to achieve the objects of the present invention.

As shown in the Figures, the elongate recesses 28 open at the compartment open ends and extend towards the bottom wall portions 26b. Each recess 28 forms a retaining side wall portion 28a, retaining end wall portions 28b and a bottom retaining wall portion 28c. The recesses thereby define a space therebetween which has a width C greater than the width A and a thickness D which is smaller than the thickness B, with the dimensions C and D being selected to correspond to the width and thickness of cassette enclosures or boxes 24 and thereby suitable for securely receiving a cassette box 24 and prevents lateral and transverse movements of the cassette box within the compartment 18.

In the presently preferred embodiment, the recesses 28 extend from the compartment open ends to a point intermediate the compartment open ends and the bottom wall portions 26b to dispose the bottom retaining wall portion 28c spaced from the bottom wall portion 26b. The bottom retaining wall portion 26b is in the nature of a depth limiting shoulder and, when spaced as shown, limits insertion of the cassette boxes 24 into the compartment 18. In this manner, the depth limiting shoulders 28c compensate for the differences in height of the cartridges 22 and cassette boxes 24.

For reasons mentioned above in connection with the cartridge 22, the depth limiting shoulders 28c are spaced from the compartment open ends a distance smaller than the height of the boxes 24 to maintain at least a portion of the cassette boxes 24 projecting above the parallel wall portions 26a upon full insertion of the cassette boxes into the compartments 18 to thereby facilitate gripping of the cassette boxes. This feature is shown in FIGS. 2 and 3. Although this is not shown, the depth-limiting shoulder 28c may be spaced above the bottom wall portions 26b a distance which is equal to the difference in heights of the cartridges 22 and cassette boxes 24 to provide full compensation whereby all the magnetic tape enclosures project equally above the parallel wall portions 26a. This is accomplished by selecting distance E in FIG. 3 to be equal to the difference in heights of the aforementioned magnetic tape enclosures.

While the two rows 20 in FIG. 1 are shown extending along the width of the portable carrying case 10, this is clearly not a critical feature of the present invention. The series of compartments arranged into rows may be disposed in any desired fashion or orientation with the carrying case. When a series of aligned compartments are arranged in a row, the corresponding wall portions of each of the compartments are arranged in a row, the corresponding wall portions of each of the compartments together define respective common planes, as shown in FIG. 1. The compartments may be arranged into a single or a large number of rows as desired. Where the carrying case 10 is in the nature of a rectangular valise, one rectangular dimension of the tape receiving portion or receptacle 12 is approximately equal to at least one width of the compartments 18 and the other rectangular dimension of the tape receiving portion or receptacle 12 is approximately equal to a multiple value of the thickness of the compartments 18. It is of course possible to alternate the general orientations of the compartment 18 within the carrying case 10 instead of aligning all the compartments along parallel rows. This variation is intended to come within the spirit of the present invention.

Referring to FIG. 1, the receptacle 12 as well as the cover 14 are advantageously provided with mating peripheral edges formed by the edges of the walls 12a– –and 14a–14d which abut against each other in the closed position of the cover 14 to sealingly close the valise 10 and protect the stored tapes 22, 24 from the elements during storage and transit. In the presently preferred embodiment, there are provided a pair of valances 56 and 58 which respectively cover the peripheral edges of the receptacle 12 and the cover 14. Each valance is in the nature of an extruded aluminum strip which is suitable for being mounted on and covering the peripheral edges of the receptacle 12 and of the cover 14. The valance 56 includes a pair of opposing grooves 56a and 56b, the groove 56a being dimensioned to receive the peripheral edges of the walls 12a–12d of the receptacle as well as the end extensions at 26' of the plastic sheet 26. On the other hand, the valance 58 has a groove 58a similar to the groove 56a and an elongate tongue 58b projecting outwardly in a direction opposite to the direction in which the groove 58a opens. The groove 58a of the valance 58 receives the edges of the walls 14a–14d. The cover 14 is hingedly mounted on the receptacle 12 to bring the peripheral tongue 58b within the groove 56b when the cover 14 is closed. In this manner, the mating groove 56b and tongue 58b serve as additional sealing means which prevent the entry of dust, humidity, and other atomspheric contaminants into the carrying case 10 to thereby protect the stored magnetic tapes.

As suggested above, each of the compartments 18 are molded and have a unitary construction. In accordance with the presently preferred embodiment, all the compartments 18, 18' are molded from a continuous sheet 26 of synthetic plastic material. As shown in the Figures, the compartments 18, 18' are arranged in rows to dispose the corresponding wall portions of each of the compartments in respective common planes and to form panels defining each of the common planes. Thus, in each row 20, the bottom wall portions 26b of the compartments 18, 18' together define a common plane. Similarly, the parallel or end wall portions 26a on each side of the compartments 18, 18' also together form common planes. In accordance with a presently preferred approach, the original plastic sheet from which the molded blank 26 is formed is flat. The ribs 26c, 26d as well as the recesses 28 are formed in the flat sheet and fold lines 26f are provided in the sheet 26 separating the panels formed by corresponding wall portions in each row of compartments. With such a molded plastic panel, assembly of the carrying case is particularly simple since the compartments may be formed by folding or bending the panel approximately 90° at each fold line 26f between a panel of side wall portions 26a and a panel of bottom wall portions 26b. In this manner, the rectangular configuration of the compartments 18, 18' is achieved.

Where more than one row of adjacent compartments are provided, the panels formed by the parallel wall portions 26a which are proximate to each other are connected by means of connecting portions 26g bridging the adjacent parallel wall portion panels of the adjacent rows to connect the same and limit excessive movement of the parallel wall portions 26a, which movements may otherwise materially change the width dimensions of the compartments 18, 18'.

When the ribs 26c, 26d extend along the entire lengths of the side wall portions 26a and bottom wall portions 26b as shown, the ribs are advantageously provided with inclined ends 26e which define angles of approximately 45° with the length direction of each of the respective ribs so that when the blank is folded about the fold lines 26f, the inclined ends 26e are brought into abutment without interfering or preventing folding of the blank as above described. With such an arrangement, a continuous dividing or separating wall is formed by the ribs. It should be clear, however, that the specific configuration of the ribs is not critical for the purpose of the present invention and it is similarly not important that the ribs extend along the entire length of the wall portions. Thus, the same results could be achieved by one only providing, for example, side ribs 26d and omitting the bottom ribs 26c. Other rib configurations which, however, at least partially bound the wall portions 26a, 26b are similarly contemplated by the present invention.

When more than one row of compartments is to be formed from a single, continuous plastic sheet, the bent connecting portions 26g may also serve as fold lines about which the two resulting back-to-back panels of side wall portions 26a may be folded 180° relative to each other as suggested in FIG. 2. Particularly in this instance, reinforcing means in the form of a separating wall 30 is provided which extends between the case bottom wall 12e and the bent connecting portions 26g. The separating wall 30 is made from a rigid material and is fixedly connected to the case bottom wall 12e by any conventional means. The separating wall 30 reinforces and rigidifies the parallel wall portions 26a which are made from a relatively flexible and resilient molded plastic material to prevent significant changes in the width dimensions A and C of the compartments. For similar reasons, as mentioned above, the valence 56 covers and secures the upper edge of the extension 26' of the plastic sheet 26 and similarly prevents excessive movements of that associated panel of side wall portions 26a. Advantageously, filler walls 30a are disposed behind each of the panels of side wall portions 26a to maintain the integrity of the molded shape and to prevent excessive flexing and deformations of the compartments.

In the presently preferred embodiment, the bottom wall portions 26b lie flat against the bottom case wall 12e. However, in a modification of the presently preferred embodiment, as shown in FIGS. 2 and 3, each bottom wall portion 26b may be inclined slightly relative to the case bottom wall 12e an amount designated by the angular quantity F. By slightly inclining or offsetting the bottom wall portions 26b, a space 52 is formed below these wall portions which is maintained by selecting the height of the separating wall 30 slightly larger than the heights of the filler walls 30a. Any other suitble means for maintaining the compartments oriented in the position shown may be utilized. When the compartments are inclined as suggested, a space 54 which normally exists between adjacent magnetic tape enclosures is increased to facilitate insertion of a finger into the space and gripping of a desired cassette or cartridge.

To enhance the esthetic appearance of the carrying case, the molded plastic sheet 26 may be provided with a decorative surface finish. For example, the molded plastic sheet 26 may be covered with a crushed flock velvet material. Other natural or simulated materials may similarly be used to enhance the surface finish and appearance of the compartment interiors. In this connection, the present case being described further includes panels 60, 62 and 64 which are advantageously provided with the same surface finish as is provided on the molded plastic sheet 26 to conceal the hinges 16 as well as provide an appearance of continuity of similar material used throughout the interior of the carrying case 10.

As suggested above, the cartridges 22 and the cassette boxes 24 are each received within the compartments 18, 18' with little or no clearance. Advantageously, for the purposes of a carrying case, the magnetic tape enclosures are snuggly received within the compartments to thereby prevent the tape enclosures from moving in longitudinal directions along the side wall portions 26a. To minimize such longitudinal movements, the interior height dimension of the carrying case 10 when the cover 14 is closed is advantageously selected to be approximately equal to the height dimension of the cartridges 22. In this manner, when the cover 14 is closed, the top wall 14e of a cover abuts against the uppermost edge or surface of the cartridges 22 and prevents longitudinal movement thereof. While a snug fit of the magnetic tape enclosures within the compartments minimizes such longitudinal movement, prevention of these movements by the cassette boxes 24 may be achieved by selecting the distance E equal to the difference in heights of the cartridges 22 and cassette box 24 to thereby bring the end surfaces of the cassette boxes to the same level as the corresponding surfaces of the cartridges 22. Now, when the cover 14 is closed, the top wall 14e would abut against both cartridges as well as the cassette boxes and prevent the undesired movements abovedescribed.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. In combination with a carrying case having a housing or receptacle, at least one insert for said casing being of the type for interchangeably receiving and storing two differently sized magnetic tape enclosures having generally rectangular configurations, the first enclosure having a smaller width and a greater thickness than the corresponding dimensions of the second enclosure, and having a height greater than the height of the second enclosure; said insert comprising a plurality of tandem storage compartments each of which is adapted to interchangeably receive a first or a second dimensioned magnetic tape enclosure, each compartment being generally rectangular in configuration and bounded on two sides by two substantially parallel wall portions spaced from each other a first predetermined distance approximately equal to the width of the first enclosure to securely receive the same therebetween and a further wall portion substantially normal to said parallel wall portions, each compartment being open on the side thereof opposite said further wall portion for receiving the enclosures; and guide means at least partially bounding said wall portions of each compartment to define a space having a thickness equal to a second predetermined distance approximately equal to the thickness of the first enclosure for guiding the first enclosures into said compartments and preventing the first enclosures from moving therein, an elongate rectangular recess provided in at least one of said spaced parallel wall portions of each compartment which opens at said compartment open end and is spaced from said further wall portions so as to form a depth limiting shoulder adapted to maintain at least a portion of said second enclosure projecting above said parallel wall portions upon full insertion of said second enclosure into said compartment, each recess forming retaining wall portions which define a space having a width greater than said first predetermined distance and a thickness smaller than said second predetermined distance suitable for securely receiving a second enclosure to thereby prevent movements of a second enclosure within said compartments, whereby the manual gripping of any second enclosure is facilitated by said depth limiting shoulder, and whereby each compartment can interchangeably receive either a first or a second enclosure and maintain each securely therein by insertion through an associated compartment open end and respective cooperation with either said guide means or said retaining wall portions of said recesses.

2. A carrying case as defined in claim 1, wherein said plurality of compartments are arranged in a row to dispose the corresponding wall portions of each of said compartments into respective common planes.

3. A carrying case as defined in claim 2, wherein a plurality of parallel adjacent rows are provided.

4. A carrying case as defined in claim 2, wherein the carrying case is in the nature of a valise having a rectangular tape-receiving portion and a cover, one rectangular dimension of said tape-receiving portion being approximately equal to at least one width of said compartments and the other rectangular dimension of said tape-receiving portion being approximately equal to a multiple value of the thickness of said compartments.

5. A carrying case as defined in claim 4, wherein said cover is hingedly connected to said tape-receiving portion by at least one hinge means for movement between a closed position and an open position wherein said tape-receiving portion is exposed to provide access to said storage compartments.

6. A carrying case as defined in claim 5, wherein said cover and tape receiving portions are provided with mating peripheral edges which abut against each other in the closed position of said cover to sealingly close the valise and protect the stored tapes from the elements during storage and transit.

7. A carrying case as defined in claim 6, further comprising mating valances extending about the peripheral edges of said cover and said tape receiving portion, one of said valances being provided with a peripheral groove and the other of said valances being provided with a mating peripheral tongue dimensioned to be received within said peripheral groove when said cover is closed, whereby said groove and tongue serve as additional sealing means.

8. A carrying case as defined in claim 1, wherein said guide means comprise ribs in the nature of separating wall portions between adjacent compartments.

9. A carrying case as defined in claim 1, and wherein said parallel wall portions of each compartment have a height smaller than the height of the first enclosures, whereby the first enclosures project above said parallel wall portions upon full insertion of the first enclosure into said compartments to an extent sufficient to bring the same into abutment against said further wall portions to thereby facilitate gripping thereof for removal.

10. A carrying case as defined in claim 9, wherein said at least one recess extends from said compartment open ends to a point intermediate said compartment open ends and said further wall portions to define a retaining wall portion in the nature of a depth limiting shoulder spaced from said further wall portions to limit insertion of the second enclosures into said compartments, whereby said depth limiting shoulders compensate for the differences in heights of the first and second enclosures.

11. A carrying case as defined in claim 10, wherein said depth-limiting shoulders are spaced from said compartment open ends a distance smaller than the height of the second enclosures to maintain at least portions of the second enclosures projecting above said parallel wall portions upon full insertion of the second enclosure into said compartments to an extent sufficient to bring the same into abutment against said depth-limiting shoulders and to facilitate gripping of the second enclosures for removal.

12. A carrying case as defined in claim 10, wherein said depth-limiting shoulders are spaced above said further wall portions a distance equal to the difference in heights of the first and second enclosures to provide full compensation wherein all enclosures project equally above said parallel wall portions.

13. A carrying case as defined in claim 1, wherein each of said compartments are moulded and have a unitary construction.

14. A carrying case as defined in claim 13, wherein all said compartments are moulded from a continuous sheet of synthetic plastic material.

15. A carrying case as defined in claim 14, wherein said compartments are arranged in a row to dispose the corresponding wall portions of each of said compartments in respective common planes and to form panels defining each of said common planes, and further comprising fold lines in said sheet of plastic material separating said panels to permit adjacent panels to be folded approximately 90° relative to each other to form said rectangular compartments.

16. A carrying case as defined in claim 15, wherein a plurality of parallel adjacent rows of compartments are provided, adjacent rows having parallel wall portions proximate to each other, and connecting portions bridging adjacent parallel wall portions of adjacent rows to connect the same and limit excessive movements of said parallel wall portions which may materially change the width dimensions of said compartments.

17. A carrying case as defined in claim 16, wherein said connecting portions form fold lines between parallel wall portions of adjacent compartments in adjacent rows which may respectively be folded approximately 180° to form said rectangular compartments in adjacent rows.

18. A carrying case as defined in claim 17, further comprising reinforcing means between parallel wall portions of adjacent rows to reinforce and rigidify said parallel wall portions to prevent material changes in the width dimensions of said compartments.

19. A carrying case as defined in claim 1, wherein the carrying case is in the form of a valise having end walls, and wherein at least some of said parallel wall portions abut against the end walls, and securing means for fixing some of said parallel wall portions to the end wall to prevent excessive movement of said parallel wall portions.

20. A carrying case as defined in claim 1, wherein said wall portions are made of a flexible and resilient material.

* * * * *